SANDFORD BASKET'S IMPROVEMENT IN HORSE POWERS
No. 120,232.  Patented Oct. 24, 1871.
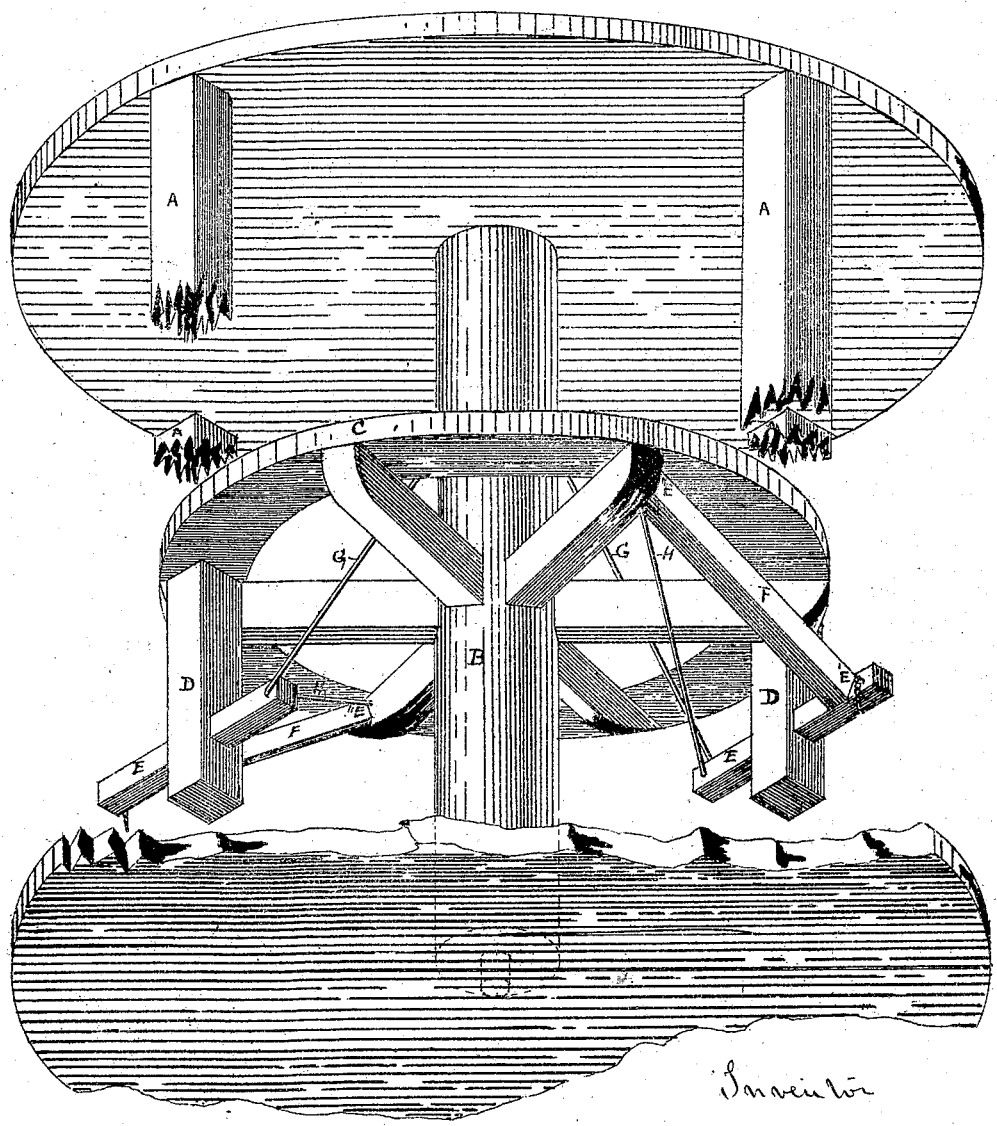

UNITED STATES PATENT OFFICE.

SANFORD BASKET, OF CRITTENDEN COUNTY, ARKANSAS.

IMPROVEMENT IN HORSE-POWERS.

Specification forming part of Letters Patent No. 120,232, dated October 24, 1871.

*To all whom it may concern:*

Be it known that I, SANFORD BASKET, of the county of Crittenden and State of Arkansas, have invented a certain Improvement in Horse-Power Machines, of which the following is a specification:

The nature and object of my invention consists in the method of connecting the horse or other animal to the driving or main wheel of a horse-power machine so as to increase the power, thereby with a less expenditure of force gaining an increased power. To effect this I attach the horse or other animal direct onto the main driving-wheel by a system of hangers, levers, and braces, instead of onto the main shaft, as in some systems.

The accompanying drawing represents a perspective elevation of the main shaft with main wheel, and the attachment for horse or other animal for setting the same in motion.

A A A A, &c., is the frame for holding in position the machinery, and forms no part of it, as these kinds of machines are ordinarily set up under sheds; B, upright shaft, carrying a driving-wheel, C. Attached to one of the arms of this driving-wheel C is a hanger, D, low enough for an animal to be attached to. At the lower end of this hanger D, and at right angles to it, is fastened the lever E. This lever E is so arranged as not to be in a direct line with the center of the upright shaft B, but so constructed and fixed as to be at an angle of twenty degrees from the outer end of this lever E at the point E′. A brace, F, starts and terminates at its other end against an arm of the wheel C, being an arm in advance of the arm onto which the hanger D is fastened. At the other end of the lever E E″ rods G and H are attached, fastened respectively to the upright shaft B and arm of driving-wheel C. At the outer end of this lever E, at E′, is fastened the axle-tree, to which the animal is attached for setting the machine in motion. On the opposite side of the main wheel C is a similar attachment made, and in its parts and construction the same as the one already described, and according to the amount of work to be done; and, an increased power required, an increased number of these attachments to the driving-wheel can be made, as specified for the first.

These attachments can be made either of metal or wood; if of wood, of dimensions not less than six inches by six inches, and of such increased dimensions as the draft of the machine requires.

I claim as my invention—

The attachment of the lever to the rim of the main driving-wheel by means of the hangers and braces, and the setting of the lever at an angle to the upright main shaft instead of its axis being in the same plane as the axis of the main shaft, substantially as and for the purpose hereinbefore set forth.

SANFORD ×̇ BASKET.
his / mark.

Witnesses:
 JAMES B. COOK,
 CHARLES S. COLLINS.

(159)